(12) United States Patent
Lee et al.

(10) Patent No.: US 12,526,069 B2
(45) Date of Patent: Jan. 13, 2026

(54) PDCCH COVERAGE ENHANCEMENT

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); Erdem Bala, East Meadow, NY (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 313 days.

(21) Appl. No.: 18/019,934

(22) PCT Filed: Aug. 5, 2021

(86) PCT No.: PCT/US2021/044612
§ 371 (c)(1),
(2) Date: Feb. 6, 2023

(87) PCT Pub. No.: WO2022/031892
PCT Pub. Date: Feb. 10, 2022

(65) Prior Publication Data
US 2023/0291496 A1    Sep. 14, 2023

Related U.S. Application Data

(60) Provisional application No. 63/061,686, filed on Aug. 5, 2020.

(51) Int. Cl.
*H04L 1/00* (2006.01)
*H04L 1/08* (2006.01)
*H04L 5/00* (2006.01)

(52) U.S. Cl.
CPC ............ *H04L 1/0038* (2013.01); *H04L 1/08* (2013.01); *H04L 5/0053* (2013.01); *H04L 5/0091* (2013.01)

(58) Field of Classification Search
CPC ....... H04L 1/0038; H04L 1/08; H04L 5/0053; H04L 5/0091
See application file for complete search history.

(56) References Cited

U.S. PATENT DOCUMENTS

2021/0168782 A1* 6/2021 Hamidi-Sepehr ........................... H04W 72/0446
2021/0194638 A1* 6/2021 Beale ................. H04L 5/006
(Continued)

FOREIGN PATENT DOCUMENTS

WO    2017/144262 A1    8/2017
WO    2020/033652 A1    2/2020
(Continued)

OTHER PUBLICATIONS

3rd Generation Partnership Project (3GPP), TS 36.321 V16.0.0, "Technical Specification Group Radio Access Network, Evolved Universal Terrestrial Radio Access (E-UTRA), Medium Access Control (MAC) Protocol Specification (Release 16)", Mar. 2020, pp. 1-141.

(Continued)

*Primary Examiner* — Kevin C. Harper
*Assistant Examiner* — Guoxing Fan
(74) *Attorney, Agent, or Firm* — Condo Roccia Koptiw LLP

(57) ABSTRACT

Systems, methods, and instrumentalities are described herein for physical downlink control channel (PDCCH) coverage enhancement for reduced capability wireless transmit/receive units (WTRUs). Overbooking rules may be applied, for example, to limit the number of blind decodes, e.g., if/when PDCCH is repeated. A coverage enhancement (CE) level may be determined for a beam. Link recovery may be performed with CE levels. A PDCCH monitoring configuration may include repetitions. The number of blind decodes with repetitions may be limited. A WTRU may (Continued)

report an indication of a best repetition. A WTRU may be configured to perform a measurement associated with a PDCCH repetition, e.g., if/when a PDCCH subject to PDCCH repetition is successfully decoded.

15 Claims, 7 Drawing Sheets

(56) References Cited

U.S. PATENT DOCUMENTS

| | | | |
|---|---|---|---|
| 2021/0329647 A1* | 10/2021 | Park | H04W 56/001 |
| 2022/0014307 A1* | 1/2022 | Taherzadeh Boroujeni | H04L 1/0038 |
| 2022/0201691 A1* | 6/2022 | Shi | H04W 72/53 |
| 2023/0117189 A1* | 4/2023 | Kim | H04L 1/0038 370/329 |

FOREIGN PATENT DOCUMENTS

| | | |
|---|---|---|
| WO | 2020/045935 A1 | 3/2020 |
| WO | 2020/069135 A2 | 4/2020 |

OTHER PUBLICATIONS

3rd Generation Partnership Project (3GPP), TS 36.331 V16.0.0, "Technical Specification Group Radio Access Network, Evolved Universal Terrestrial Radio Access (E-UTRA), Radio Resource Control (RRC), Protocol Specification (Release 16)", Mar. 2020, pp. 1-1048.

3rd Generation Partnership Project (3GPP), TS 38.211 V16.0.0, "Technical Specification Group Radio Access Network, NR, Physical Channels and Modulation (Release 16)", Dec. 2019, pp. 1-129.

3rd Generation Partnership Project (3GPP), TS 38.212 V16.0.0, "Technical Specification Group Radio Access Network, NR, Multiplexing and Channel Coding (Release 16)", Dec. 2019, pp. 1-145.

3rd Generation Partnership Project (3GPP), TS 38.213 V16.0.0, "Technical Specification Group Radio Access Network, NR, Physical Layer Procedures for Control (Release 16)", Dec. 2019, pp. 1-146.

3rd Generation Partnership Project (3GPP), TS 38.214 V16.0.0, "Technical Specification Group Radio Access Network, NR, Physical Layer Procedures for Data (Release 16)", Dec. 2019, pp. 1-147.

* cited by examiner

PDCCH COVERAGE ENHANCEMENT

CROSS-REFERENCE TO RELATED APPLICATIONS

This application is the National Stage Entry under 35 U.S.C. § 371 of Patent Cooperation Treaty Application No. PCT/US2021/044612, filed Aug. 5, 2021, which claims the benefit of Provisional U.S. Patent Application No. 63/061,686, filed Aug. 5, 2020, the disclosure of which is incorporated herein by reference in its entirety.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for physical downlink control channel (PDCCH) coverage enhancement (CE). Such coverage enhancement may be used with wireless transmit/receive units (WTRUs), such as reduced capability WTRUs, for example. Overbooking rules may be applied, for example, to limit the number of blind decodes, e.g., if/when PDCCH is repeated. A CE level may be determined for a beam. Link recovery may be performed with CE levels. A PDCCH monitoring configuration may include repetitions. The number of blind decodes with repetitions may be limited.

An indication of a first search space (SS) and an indication of a second SS may be received. For example, an SS (e.g., each SS) may comprise one or more respective PDCCH candidates. At least one of the SSes may comprise one or more repetitions configured within a repetition cycle. A priority of the first SS relative to the second SS may be determined (e.g., for a time span including one or more PDCCH candidates of the first SS and one or more PDCCH candidates of the second SS), for example, based on information indicative of the repetition cycle. One SS to monitor may be determined based on the priority, for example, if monitoring the PDCCH candidates associated with the first SS and the second SS exceeds a decoding limit (e.g., a blind decoding limit). The determined SS may be monitored.

DETAILED DESCRIPTION

Figure 1A:
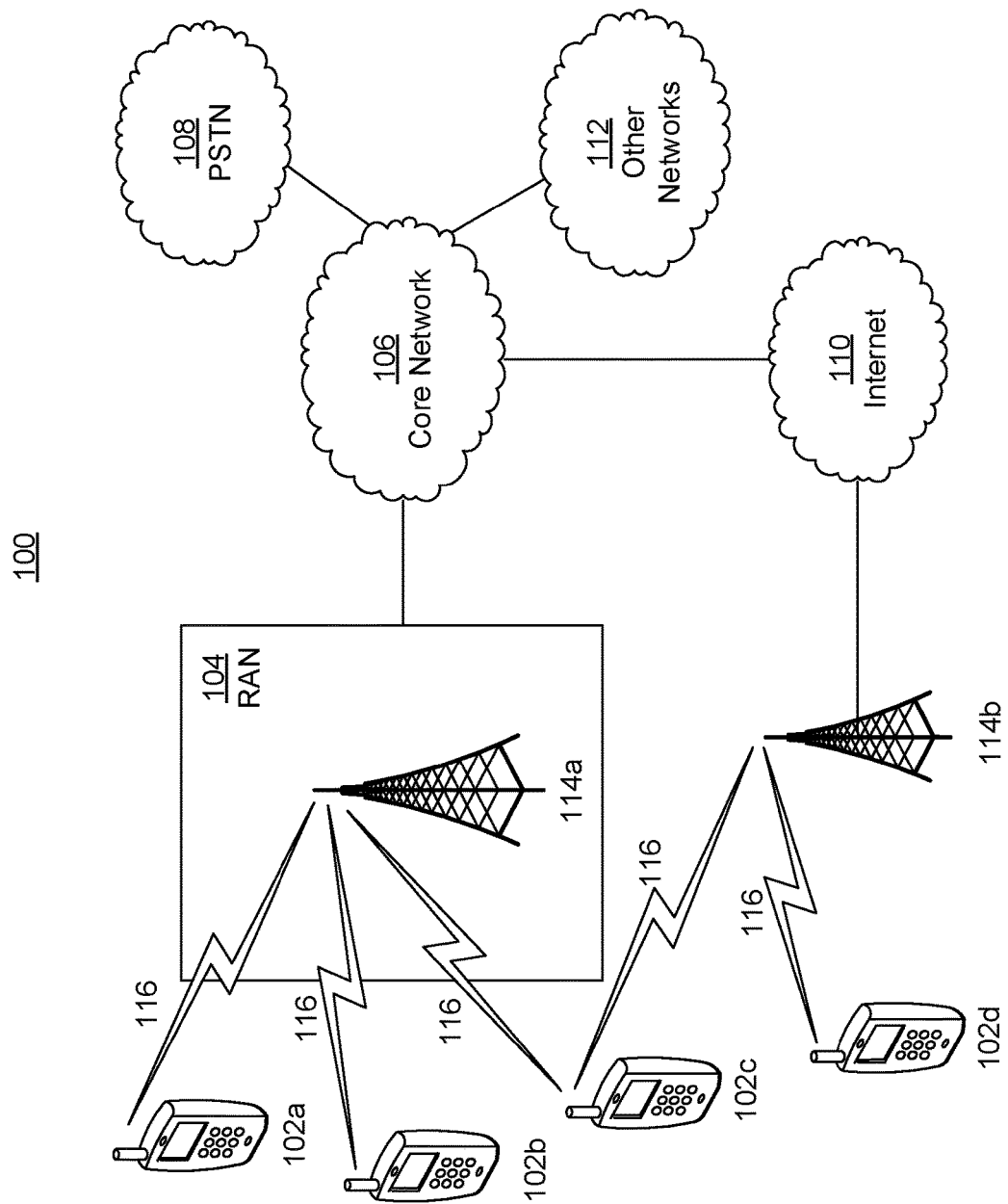
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (I) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
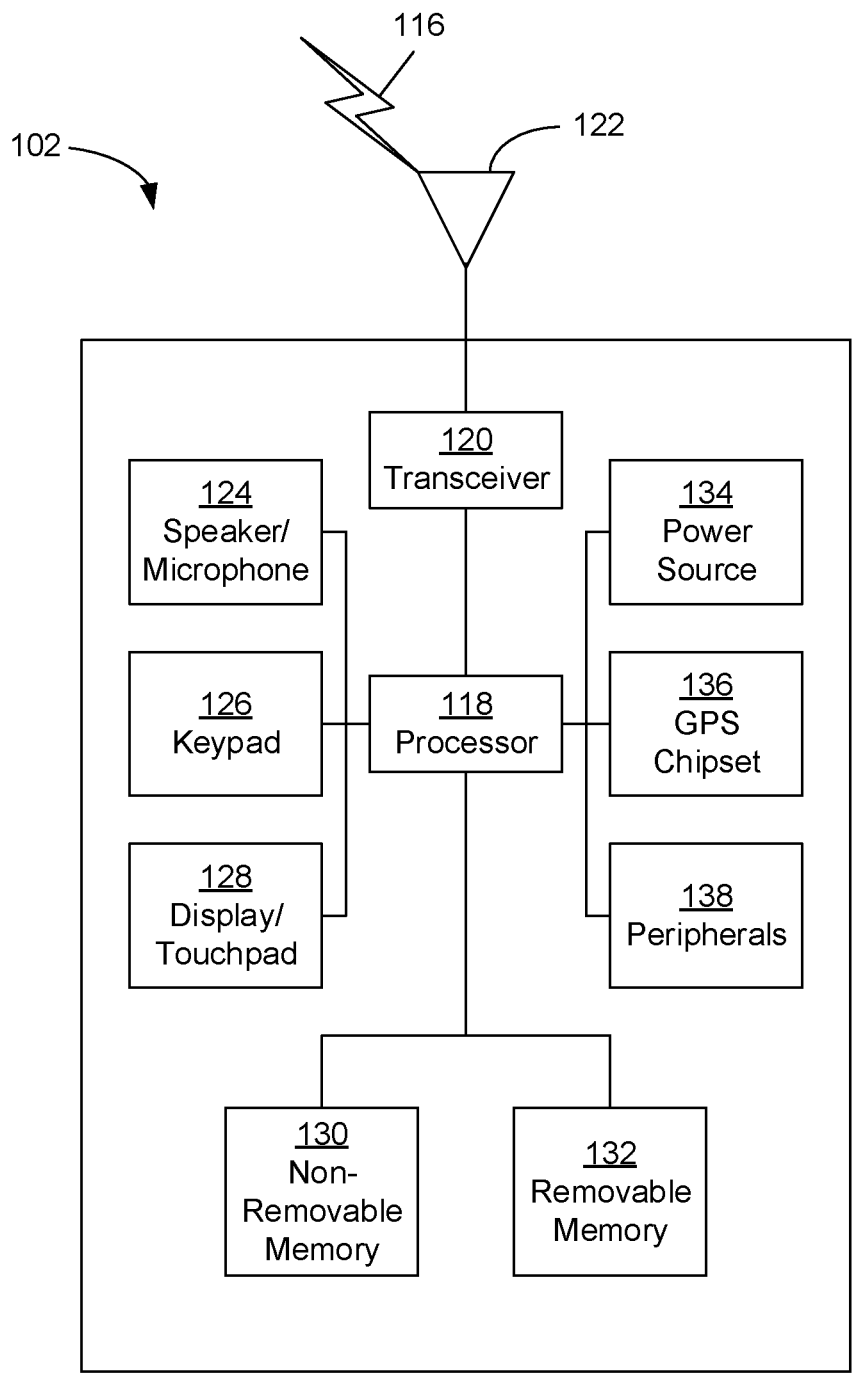
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
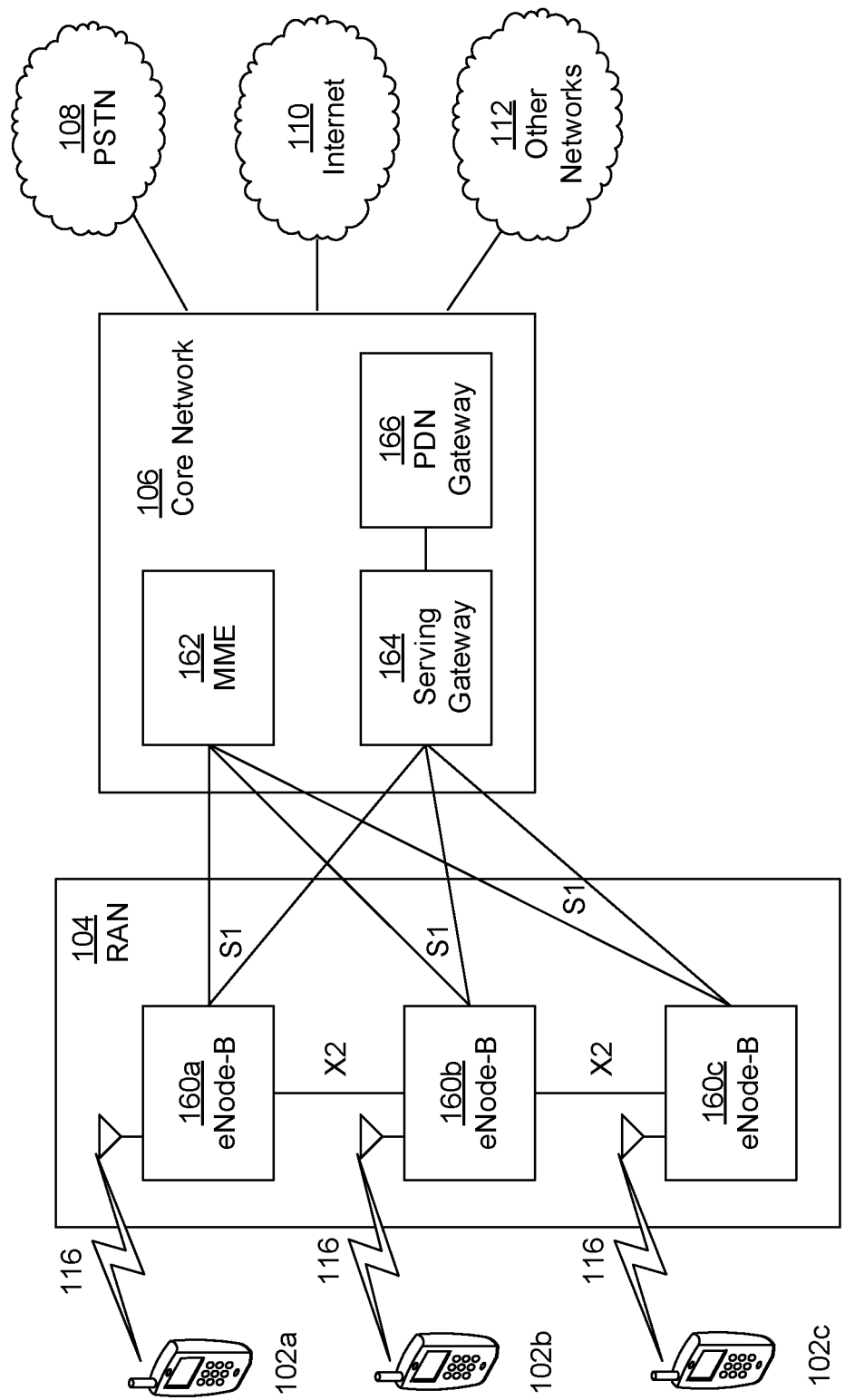
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
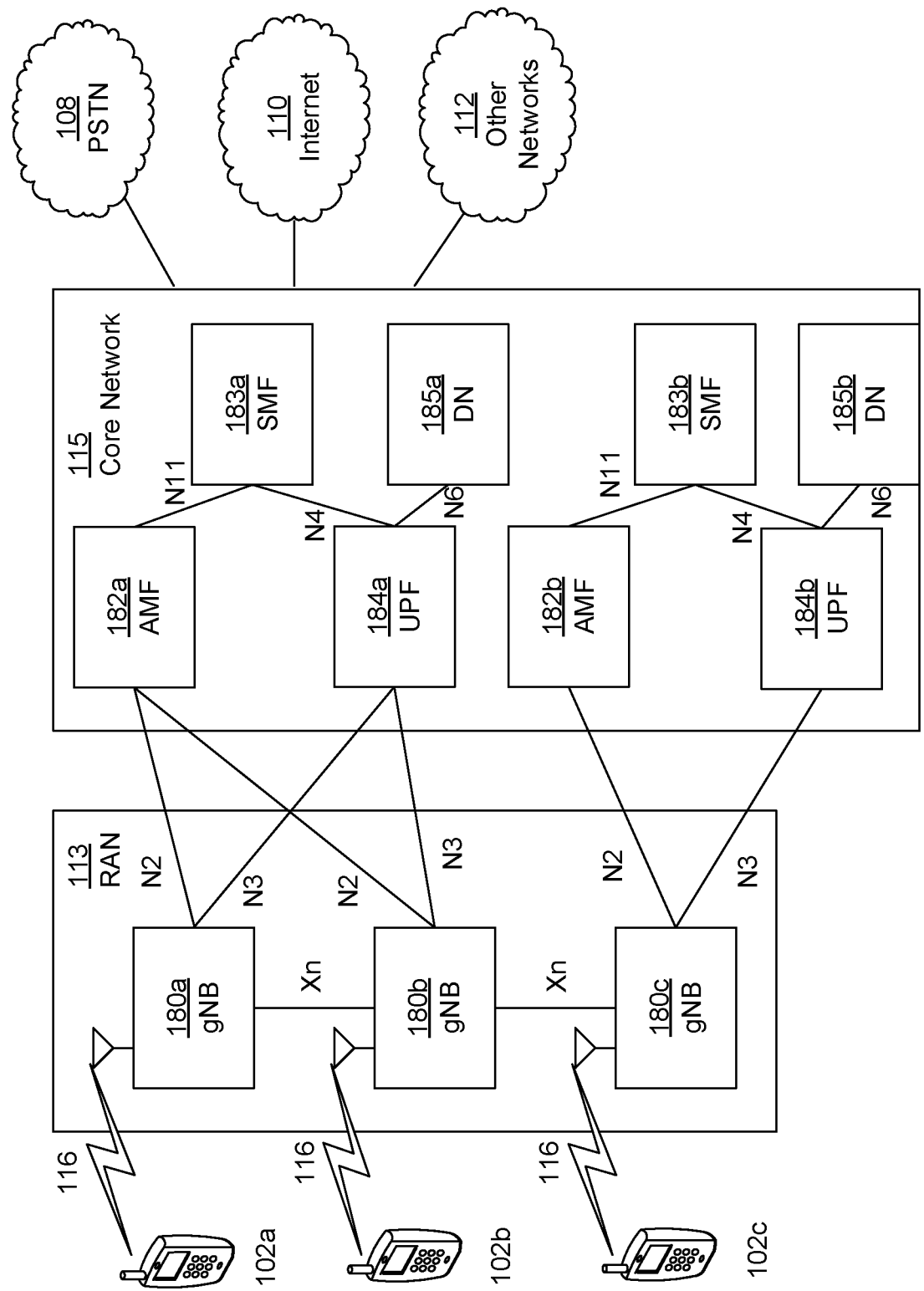
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may monitor a set of physical downlink control channel (PDCCH) candidates in one or more control resource sets (CORESETs) on an active downlink (DL) bandwidth part (BWP) on an activated serving cell (e.g., each activated serving cell) configured with PDCCH monitoring according to corresponding search space (SS) sets. Monitoring may imply and/or involve decoding and/or attempting to decode one or more PDCCH candidates within a corresponding SS and/or SS set. Monitoring may imply and/or involve decoding a PDCCH candidate (e.g., each PDCCH candidate). Monitoring may imply and/or involve decoding a PDCCH candidate (e.g., each PDCCH candidate) according to monitored downlink control information (DCI) formats. A PDCCH may be repeated. A WTRU may (e.g., be expected to) receive more than one repetition of a PDCCH, for example, to decode a PDCCH candidate. A WTRU may decode a candidate, for example, after the WTRU combines the monitored repetitions.

A Resource Element Group (REG) may be a building block (e.g., the smallest building block) for PDCCH. A REG (e.g., each REG) may include, for example, a number of resource elements (REs) (e.g., 12 resource elements) on an OFDM symbol (e.g., one OFDM symbol) in time and a resource block (RB) (e.g., one resource block) in frequency. In a REG (e.g., each REG), there may be a number of REs (e.g., nine) that may be used for control information and a subset of the number (e.g., three REs) that may be used for demodulation reference signal(s) (DMRS). Multiple REGs (e.g., 2, 3, or 6 REGs), adjacent in time and/or frequency, may form a REG bundle. The REGs in an REG bundle may be used with the same precoder and their DMRSs may be used together for channel estimation. A number of REGs (e.g., six REGs in the format of 1, 2, or 3 REG bundles) may form a Control Channel Element (CCE) (e.g., one Control Channel Element), for example, which may be a PDCCH (e.g., the smallest possible PDCCH). A PDCCH (e.g., each PDCCH) may include, for example, one or more CCEs (e.g., 1, 2, 4, 8, or 16 CCEs). The number of CCEs for a PDCCH may be referred to as an aggregation level (AL).

Mapping of REG bundles may use interleaving or non-interleaving for the mapping. In or for a non-interleaving mapping, consecutive REG bundles (e.g., adjacent in frequency) may form a CCE and CCEs adjacent in frequency may form a PDCCH. In or for an interleaving mapping, REGs may be interleaved (e.g., or permuted) before being mapped to CCEs, for example, resulting in (e.g., resulting in generally) non-adjacent REG bundles in a CCE (e.g., one CCE) and non-adjacent CCEs in a PDCCH (e.g., one PDCCH).

A Control Resource Set (CORESET) may be configured by or may comprise at least one of: a frequency assignment (e.g., as chunks or groups of 6 RBs), a length in time (e.g., 1 to 3 OFDM symbols), a type of REG bundle, and a type of mapping from REG bundles to CCEs (e.g., whether it is interleaving or non-interleaving). In a bandwidth part (BWP) (e.g., each bandwidth part), there may be up to an N CORESETs (e.g., 3 CORESETs). For example, there may be 12 CORESETs in 4 possible bandwidth parts.

A WTRU may monitor and/or may be assigned a set of PDCCH candidates (e.g., to monitor). A set of PDCCH candidates may be monitored, for example, during the blind detection of PDCCH. A search space (SS) or a set of search spaces (e.g., for multiple aggregation levels) may be or may include a set of PDCCH candidates (e.g., to monitor such as with blind detection). A search space (e.g., each search space) or set of search spaces may be configured by at least one of: an associated CORESET, a number of candidates for or within each aggregation level, and a set of monitoring occasions. The monitoring occasions may be determined by one or more of a monitoring periodicity (e.g., in terms of slots), a monitoring offset, a monitoring pattern (e.g., with 14 bits corresponding to the possible patterns of symbols inside a slot), and/or the like.

A WTRU such as a reduced capability WTRU may be equipped with fewer receive antennas than other WTRUs (e.g., conventional WTRUs). The maximum transmission bandwidth a WTRU (e.g., a reduced capability WTRU) supports may be smaller than a maximum transmission bandwidth for another WTRU (e.g., a conventional WTRU). A WTRU (e.g., a reduced capability WTRU) may suffer from loss of coverage of downlink channels, for example, due to the aforementioned reasons, e.g., in addition to other reduced capabilities. A WTRU (e.g., a reduced capability WTRU) may have limitations in its processing power and/or battery usage, for example, which may lead to limited operation, such as a reduction in power consumption and/or processing load. One or more procedures may compensate for coverage loss of DL channels of a WTRU (e.g., a reduced capability WTRU).

Figure 2:
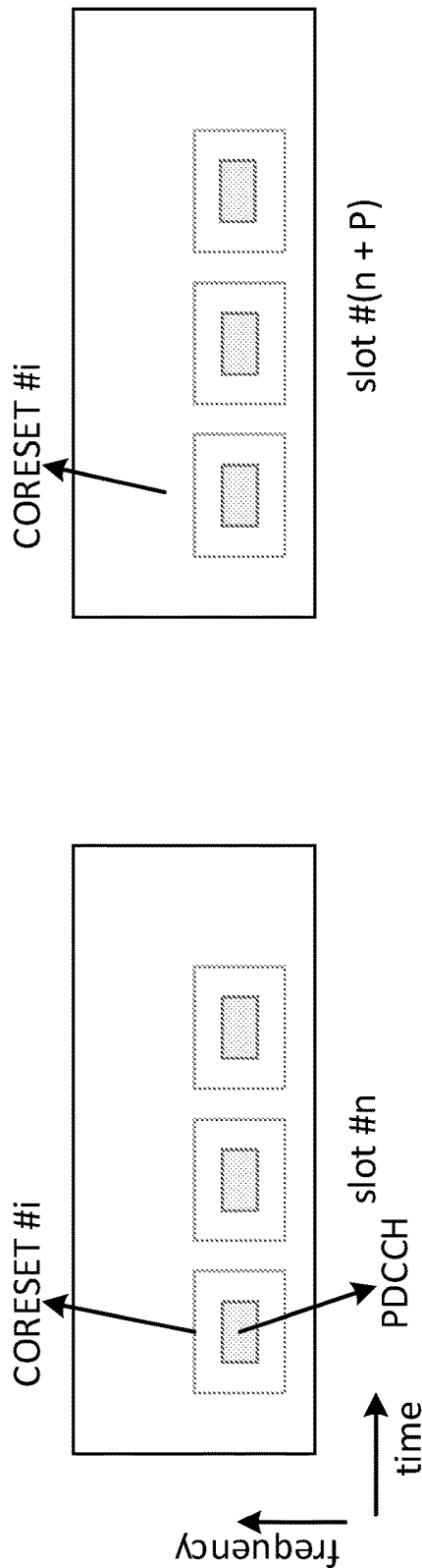
FIG. 2 illustrates an example of physical downlink control channel (PDCCH) repetition.

PDCCH coverage may be enhanced. An SS and/or SS configuration may support enhanced coverage. For example, a PDCCH candidate may be repeated in the same CORESET within a slot and/or across slots (e.g., as shown by example in FIG. 2). FIG. 2 illustrates an example of PDCCH repetition. A repetition (e.g., PDCCH candidate repetition) may be or may occur over at least one monitoring occasion (MO). The monitoring occasions of a PDCCH candidate may be determined by a corresponding SS configuration. A PDCCH candidate and PDCCH may be used interchangeably (e.g., without loss of generality).

A WTRU may determine the MOs of a PDCCH transmission from an SS configuration (e.g., from the monitoringSlotPeriodicityAndOffset parameter). A WTRU may determine from the SS configuration a time interval over which repetitions of the PDCCH may be (e.g., may expected to be) monitored. For example, a duration parameter may indicate the time interval in slots. An SS configuration may indicate to a WTRU a number of repetitions of the PDCCH that may be performed within a slot. An SS configuration may indicate to the WTRU the time location(s) of the repetitions within a slot (e.g., time location(s) may be the OFDM symbol indices). For example, a WTRU may determine time locations from a parameter (e.g., the parameter monitoringSymbolsWithinSlot). The starting symbol of a repetition (e.g., each repetition) may be determined, for example, from bits set to 1 in a bitfield. The number of symbols used for each repetition may be determined from the CORESET duration. For example, a CORESET duration may be two OFDM symbols and the monitoringSymbolsWithinSlot parameter value may be [10010010010000]. In such a case, the WTRU may determine, for example, that the PDCCH is repeated four times and is transmitted on symbols {1,2}; {4,5}; {7,8}, and {10,11}.

Figure 3:
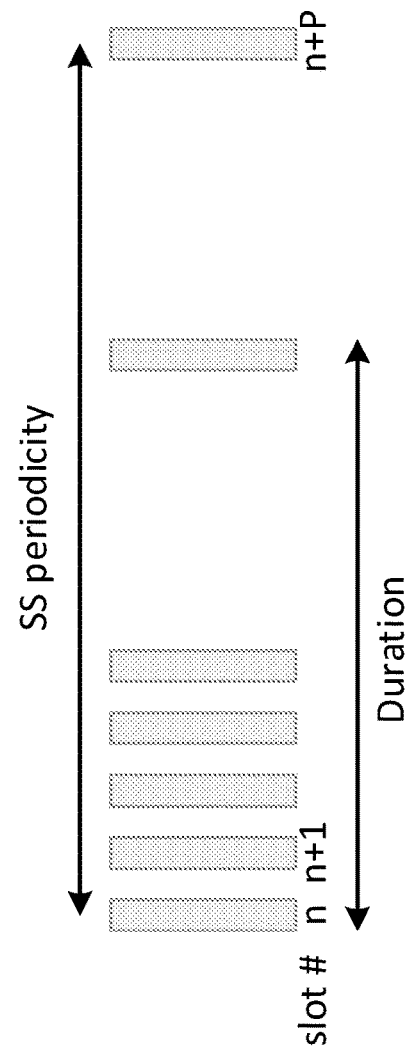
FIG. 3 illustrates an example of monitoring occasions within a search space.

FIG. 3 illustrates an example of monitoring occasions within a search space. FIG. 3 illustrates an example showing the MOs of a PDCCH, where P (e.g., as shown in FIG. 3) refers to the monitoring periodicity. A WTRU may start monitoring a PDCCH in slot n. The WTRU may determine, for example, that PDCCH is not repeated beyond slot (n+Duration−1) or (n+Duration), e.g., depending on how Duration (e.g., as shown in FIG. 3) is defined. A Duration parameter may indicate, for example, a maximum number of repetitions configured, or a number of repetitions used.

A WTRU may be configured for an SS with a periodicity and an offset parameter value (e.g., referred to as the RepetitonSlotPriodicityAndOffset). A WTRU may be configured with a repetition duration parameter (e.g., referred to as the RepetitionDuration). A WTRU may monitor the MOs of an SS in a time interval. The time interval may be defined as or determined from, for example: a starting slot (e.g., slot m, m+RepetitionDuration, etc.) which may be determined from a periodicity and offset parameter value (e.g., RepetitonSlotPriodicityAndOffset) and/or a length of the time interval which may be determined from a repetition duration parameter (e.g., RepetitionDuration). A WTRU may monitor the MOs in the time interval, for example, in {slots m, m+1, . . . , m+RepetitionDuration−1). A WTRU may (e.g., be configured to) determine that RepetitionDuration may be derived from RepetitonSlotPeriodicity (e.g., RepetitionDuration equals RepetitonSlotPriodicity), for example, if RepetitionDuration is not configured. An example is illustrated in FIG. 4.

Figure 4:
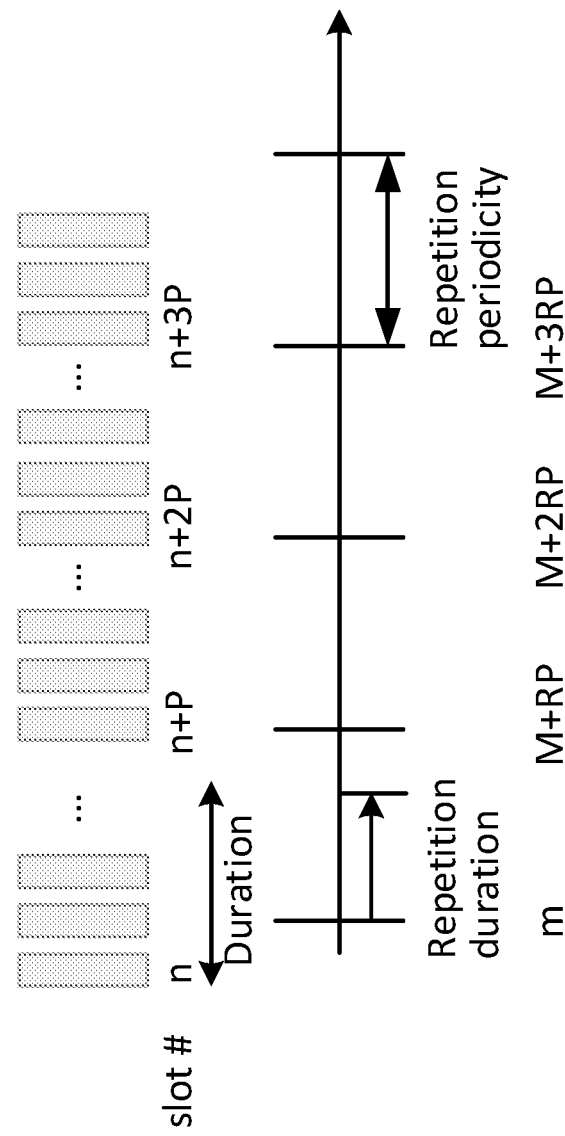
FIG. 4 illustrates an example of monitoring occasions within a time interval.

FIG. 4 illustrates an example of monitoring occasions within a time interval. As shown in FIG. 4, RP refers to the repetition periodicity. A WTRU may (e.g., be configured to) expect, for example, that PDCCHs transmitted in the time interval carry the same information (e.g., the PDCCHs are repetitions of the same channel).

A WTRU may determine that PDCCH candidates monitored in a given time interval (e.g., as shown in FIG. 3 and FIG. 4) carry the same information (e.g., PDCCH candidates may be determined to be repetitions of the same PDCCH). The WTRU may determine whether PDCCH candidates are repetitions, for example, based on at least one of the following: WTRU type, CORESET ID, SS ID and/or SS type, SS configuration, radio network temporary identifier (RNTI), DCI format, and/or the like.

A WTRU may determine whether PDCCH candidates are repetitions, for example, based on WTRU type. For example, a WTRU (e.g., a reduced capability WTRU) may determine that k PDCCH within a slot comprise the same information. Another type of WTRU may determine that the k PDCCH within a slot may carry different information.

A WTRU may determine whether PDCCH candidates are repetitions, for example, based on CORESET ID. A WTRU may determine that k PDCCH transmitted on a specific CORESET may carry the same information.

A WTRU may determine whether PDCCH candidates are repetitions, for example, based on SS ID and/or SS type. A WTRU may determine from the SS ID and/or SS type (e.g., WTRU specific or WTRU common) whether the k PDCCH carry the same information.

A WTRU may determine whether PDCCH candidates are repetitions, for example, based on SS configuration. An SS configuration may indicate the number of maximum repetitions configured and/or the number of repetitions used.

A WTRU may determine whether PDCCH candidates are repetitions, for example, based on RNTI. A WTRU may determine that the k PDCCH carry the same information, for example, if a specific RNTI is used to decode the DCI (e.g., an RNTI other than C-RNTI).

A WTRU may determine whether PDCCH candidates are repetitions, for example, based on DCI format. A WTRU may determine that the k PDCCH carry the same information, for example, if a specific DCI format is used.

In some examples, at least part of the repetitions (e.g., one or more repetitions) may occur over different CORESETs. For example, repetitions within the same slot may occur on the same CORESET while repetitions across different CORESETs may occur on different CORESETs.

A WTRU may selectively buffer a physical downlink shared channel (PDSCH). A PDSCH corresponding to a PDCCH may be transmitted with more than one repetition. The repetitions may occur within a slot and/or over multiple slots (e.g., two or more slots). For example, a WTRU may receive three repetitions of a PDSCH over four orthogonal frequency-division multiplexing (OFDM) symbols within a slot (e.g., one slot). A PDSCH may be repeated over multiple slots.

In examples, a WTRU may start receiving the PDSCH before the final repetition of the PDCCH is completed. The starting point of the first repetition of the PDSCH may be determined, for example, based on timing of the first repetition of the corresponding PDCCH. For example, a WTRU may start monitoring an SS of the PDCCH in slot #n and the WTRU may start receiving the PDSCH in slot #n+k, for example, where k may be smaller than the repetition duration.

In examples, at least one of the transmission parameters of the PDSCH may be predefined. The transmission parameters of the PDSCH may include, for example, one or more of the following: the time and/or frequency resources of the PDSCH and/or a time and/or frequency resource in which the PDSCH is located, a modulation and coding scheme (MCS) of the PDSCH, a redundancy version of the PDSCH repetitions, and/or the like. In examples, a WTRU may determine a subset of frequency resources for a PDSCH prior to decoding a frequency domain resource allocation of a scheduling DCI. A subset of frequency resources may be signaled, for example, by a radio resource control (RRC) or by a medium access control (MAC) control element (CE). A WTRU may (e.g., be configured to) determine that a resource indicated by a frequency domain resource allocation (FDRA) is within the subset of frequency resources scheduled for PDSCH, for example, which may enable buffering a portion of a bandwidth part for PDSCH (e.g., for PDSCH only).

The number of blind decodes may be reduced. The number of PDCCH candidates to monitor per AL may be determined, for example, based on a repetition level. An SS may be configured with a number of PDCCH candidates to monitor per AL. In examples, a repetition level parameter (e.g., referred to as repetition level) may be used, determined, and/or configured. A repetition level may be associated with a set of repetitions for a physical channel (e.g., PDCCH) and/or a signal. A repetition level may be determined from the maximum number of transmissions for a channel (e.g., maximum number of channels used and/or configured). A repetition level may be determined from the maximum number of transmissions for a signal. A repetition level may be determined from the maximum number of transmissions for the maximum number of repetitions (e.g., used and/or configured repetitions) within a slot. For example, 16 repetitions over 16 slots, 16 repetitions over 8 slots, and each slot with 2 repetitions, may (e.g., each) be assigned a different repetition level.

An SS may be associated with a repetition level. For example, a WTRU may (e.g., be configured to) determine that the PDCCH candidates monitored using an SS may be repeated according to a number of repetitions associated with the repetition level.

In examples, a WTRU may be configured with a search space (e.g., may receive information indicative of a search space configuration). Such information may include an indication of one or more search spaces. A search space may include one or more PDCCH candidates. For example, a search space may include (e.g., for each repetition level) the number of PDCCH candidates per AL. For example, with repetition level 1, an SS may be configured with {8, 4, 2, 2, 1} PDCCH candidates per slot for ALs {1, 2, 4, 8, 16}, respectively. For example, with repetition level 2, the SS may be configured with {4, 2, 1, 0, 0} PDCCH candidates per slot for the same ALs.

In examples, a WTRU may be configured with a number of PDCCH candidates per AL and repetition levels that may be determined for each PDCCH candidate/AL pair (AL and number of PDCCH candidates). An example is shown in Table 1.

TABLE 1

| AL | Number of PDCCH candidates | Repetition level |
| --- | --- | --- |
| 1 | 8 | 1, 2 |
| 2 | 4 | 1, 2 |
| 4 | 2 | 2, 3 |
| 8 | 1 | 3 |
| 16 | 1 | 3 |

In examples, the number of PDCCH candidates per AL may be determined from the number of repetitions within a slot. For example, a WTRU may monitor a SS using a first set of values (e.g., configured values) of the number of PDCCH candidates for a first number of repetitions of the PDCCH per slot. The WTRU may monitor a second set of values (e.g., configured values) of the number of PDCCH candidates for a second number of repetitions of the PDCCH per slot. In examples, the number of repetitions in a slot may be, for example, 1, 2 or 4. A WTRU may monitor the SS using a first, second or third set of configured values of the number of PDCCH candidates, for example, when the number of repetitions of the PDCCH per slot is 1, 2, or 4, respectively. Table 2 shows an example of a configuration for a WTRU to monitor the SS with the number of PDCCH candidates based on the number of repetitions within a slot.

TABLE 2

| Number of repetitions in a slot | Number of PDCCH candidates for AL {1, 2, 4, 8, 16} |
|---|---|
| 1 | {8, 4, 2, 1, 1} |
| 2 | {4, 2, 1, 1, 0} |
| 4 | {2, 1, 1, 1, 0} |

In examples, the number of PDCCH candidates to monitor per repetition in a slot per AL may be determined, for example, as a function of the repetition level. An example of a function may be M_i=floor(M/k), where M may be the number of configured PDCCH candidates to monitor for a given AL without repetitions, k may be the repetition level (e.g., the number of repetitions within a slot), and M_i may be the number of PDCCH candidates to monitor per repetition. For example, the number of PDCCH candidates per AL may be {8, 4, 2, 1, 1}. If a repetition level set to 2, the number of PDCCH candidates per AL per repetition may become, for example, floor({8, 4, 2, 1, 1}/2)={4, 2, 1, 0, 0} for a floor function, or ceil({8, 4, 2, 1, 1}/2)={4, 2, 1, 1, 1} for a ceiling function.

A repetition level used for a transmission may be configured and/or signaled to the WTRU (e.g., in a DCI within the PDCCH). The repetition level may be determined (e.g., determined implicitly) by the WTRU from other transmission parameter(s). In examples, a CORESET ID may indicate to the WTRU a subset of the repetition levels that may be used in the CORESET. For example, repetitions within a slot may not be expected in a first CORESET (e.g., based on a first CORESET ID) while repetitions may be expected in a second CORESET (e.g., based on a second CORESET ID). In examples, repetitions may not be expected in a third CORESET (e.g., based on a third CORESET ID). In examples, the repetition level (e.g., the number of repetitions) may be indicated to a WTRU with RNTI (e.g., where one RNTI may be used for one repetition level). For example, a WTRU may attempt to decode the PDCCH after N repetitions with RNTI-1; the WTRU may attempt to decode the PDCCH after 2N repetitions with RNTI-2, and so on. The RNTIs may be determined, for example, from the C-RNTI. For example, RNTI may be determined, for example, based on RNTI-1=C-RNTI, RNTI-k=C-RNTI+v_k, where v_k may be a function of the repetition level corresponding to RNTI-k.

A search space may be associated with at least one offset that determines the starting PDCCH candidate for a set of repetitions. In examples, repetition may occur over 8 slots and the offset may be set to zero. A first PDCCH may be repeated in slots 0 to 7, a second PDCCH may be repeated in slots 8 to 15, etc. In examples, the offset may be set to four. A first PDCCH may be repeated in slots 4 to 11 and a second PDCCH may be repeated in slots 12 to 19. An offset may be specified and/or indicated, for example, in units of slots, symbols, and/or indexed by PDCCH monitoring occasion.

In examples, an offset (e.g., each offset) of a search space may be associated and/or configured with a specific RNTI value for decoding. For example, a WTRU may attempt decoding from a first set of PDCCH repetitions determined from a first offset using a first RNTI and from a second set of PDCCH repetitions determined from a second offset using a second RNTI. The first and second set of PDCCH repetitions may overlap. This may support (e.g., enable) decreasing the interval between two possible scheduling instances without excessively increasing the channel estimation and blind decoding complexity (e.g., since the first and second set of PDCCH repetitions overlap).

In examples, PDCCH to CCE mapping may not change within a set of repetitions. In an example (e.g., in NR), for a search space, the CCE indexes (e.g., for aggregation level L corresponding to a PDCCH candidate of the search space set) may be determined as a function of the slot number and C-RNTI. For example, the PDCCH candidate to CCE mapping may vary from one slot to another.

In examples, the PDCCH candidate to CCE mapping may be performed such that the mapping may not change within a portion of the duration where repetitions occur. For example, given a repetition duration of M slots (e.g., M=16), the mapping may stay unchanged over slot groups of N (e.g., N=4), e.g., where the slots in a slot-group may be determined to be consecutive. A WTRU may determine that the mapping stays unchanged in slots 0-3, 4-7, 8-11, and 12-15, but may change between slot groups. The size of the slot group, e.g., N, may be configured.

The PDCCH to CCE mapping in a slot may be determined, for example, as a function of the slot-group to which the slot belongs. A slot-group number may be configured, determined, defined and/or indexed. The slot-group (e.g., slot-group number or index) may be used to determine the mapping per slot in the group. One or more of the following may apply. The slot-group number (e.g., index) may be the slot number of one of the slots in the group (e.g., the first slot in the group). For example, for slot-group including slots 0-3, the PDCCH to CCE mapping may be a function of slot-group number 0; for slot group including slots 4-7, the PDCCH to CCE mapping may be a function of slot-group number 4, etc. The slot-groups within a duration may be indexed. The index may be used to determine the mapping for the slots in the group. For example, given 8 slot-groups of 4 slots each within a duration of 32 slots, the slot group indices may be 0, 1, . . . , 7. A slot-group number may be computed, for example, as div(n_sf/N), e.g., where n_sf may be the slot number.

Overbooking rules may be applied to limit the number of blind decodes. A WTRU may (e.g., may determine to) monitor or not monitor all or part of an SS, e.g., in a time span, for example, based on the priority of the SS. For example, a WTRU may (e.g., may determine to) monitor or drop (e.g., not monitor) all or part of a first SS in a time span, for example, based on a priority (e.g., its priority) of the SS or based on a relative priority of the SS to another SS in the time span.

A WTRU may determine a priority for an SS, for example, where the priority of the SS may be based on or may be a function of at least one of the following: whether there is a CE level and/or a number of repetitions configured for or associated with the SS (e.g., for monitoring the SS), a CE level and/or a number of repetitions configured for or associated with the SS (e.g., for monitoring the SS), a repetition number of the SS; for example, the repetition number (e.g., n) of the SS in a time span within a number of repetitions (e.g., N) configured for or associated with the SS, a number of repetitions remaining for monitoring the SS, whether the WTRU has already received or decoded (e.g., successfully received or decoded) a PDCCH (e.g., PDCCH candidate), for example, based on one or more previous repetitions of the SS, PDCCH, and/or PDCCH candidate.

A WTRU may (e.g., may determine to) monitor or drop (e.g., not monitor) an SS (e.g., all or part of an SS), for example, based on SS priority (e.g., SS relative priority), for example, in order to not exceed a limit, such as a monitoring or blind decoding limit (e.g., in a time span). An SS may comprise one or more PDCCH candidates. A PDCCH candidate may comprise one or more CCEs. A WTRU may (e.g., may determine to) monitor part of an SS. Partial monitoring may include a subset of the PDCCH candidates and/or a subset of the CCEs associated with the SS. A PDCCH candidate may be associated with an aggregation level. Partial monitoring may include, for example, monitoring candidates corresponding to a subset of aggregation levels (e.g., a subset of the aggregation levels configured for or associated with the SS).

A WTRU may monitor and/or may be configured to monitor one or more search spaces, for example, during a time span, such as a slot. A WTRU may monitor for a PDCCH in an SS.

A slot may be (e.g., as used herein) a representative non-limiting example of a time span. Another time span may be used consistent with the disclosure, including non-limiting examples described herein. Some other non-limiting examples of a time span include, for example, a symbol, a set of symbols, one or more symbols, a set of slots, one or more slots, one or more subframes, a set of subframes, and/or the like. For example, a span may refer to a span of time. Such a span may be represented by a contiguous set of symbols, one or more symbols, a set of slots, one or more slots, one or more subframes, a set of subframes, and/or the like. Such a span may be represented by a start symbol plus length indicator value (e.g., SLIV) and/or duration.

A WTRU may (e.g., may be configured to) monitor an SS (e.g., an SS in a time span, such as a slot) for a repetition (e.g., at least one repetition) of a PDCCH. A WTRU may monitor and/or may be configured to monitor an SS (e.g., at least one SS in a time span). A WTRU may combine one or more repetitions of a PDCCH, for example, to decode the PDCCH (e.g., decode the PDCCH successfully). A PDCCH may be a PDCCH candidate.

A WTRU may have one or more limits (e.g., maximums, rules, thresholds and/or capabilities) that may be related to SS and/or PDCCH monitoring, for example, in a time span, such as a slot. For example, there may be a limit on at least one of the following: the number of PDCCH candidates to monitor, the number of CCEs to monitor, the aggregation levels to monitor, and/or the like. A limit may apply in a time span.

A WTRU may determine which search space(s), PDCCH candidate(s), CCE(s), and/or CORESET(s) to monitor, receive, and/or decode (e.g., in a time span), for example, based on one or more limits (e.g., to not exceed one or more limits). A WTRU may determine which search space(s), PDCCH candidate(s), CCE(s), and/or CORESET(s) to not monitor, not receive, and/or not decode (e.g., in a time span), for example, based on one or more limits (e.g., to not exceed one or more limits).

A WTRU may determine which search space(s), PDCCH candidate(s), CCE(s), and/or CORESET(s) to monitor, receive, and/or decode (e.g., in a time span), for example, based on the priorities (e.g., relative priorities) of the SS(es) associated with the PDCCH candidate(s), CCE(s), and/or CORESET(s).

A time span may include multiple SSes to be monitored by a WTRU. The WTRU may order the SSes by priority (e.g., highest priority to lowest priority) and/or determine the k highest priority SSes, for example, where k may be the number of high priority SSes the WTRU may monitor without exceeding a monitoring limit (e.g., a blind decoding limit). The WTRU may monitor PDCCH candidates (e.g., some or all of the PDCCH candidates), for example, in each of the k highest priority SSes.

A first set of priorities (e.g., relative priorities) may apply to a set of SSes, for example, if none of the SSes in the set are configured for, associated with, and/or monitored using a CE level or repetition(s). A second set of priorities (e.g., relative priorities) or a modified version of the first set of priorities may apply to a set of SSes, for example, if at least one of the SSes in the set is configured for, associated with, and/or monitored using a CE level or repetition(s).

In an example, a WTRU may be configured to monitor an SS (e.g., for one or more PDCCH candidates) with a number of repetitions, N. The SS may be configured, for example, such that the WTRU may determine (e.g., from the configuration) when the first repetition and each of the subsequent repetitions of the N repetitions may occur. The times when the repetitions may occur may be represented, for example, by time0, time1, . . . , timeN−1. The WTRU may monitor the SS in one or more of the repetition times (e.g., all of the repetition times) time0 to timeN−1 and may combine the one or more repetitions, for example, to receive and/or decode (e.g., successfully receive and/or decode) a PDCCH. A WTRU may combine fewer than N repetitions to receive and/or decode (e.g., successfully receive and/or decode) a PDCCH.

A repetition cycle may include and/or may be used to represent a set of repetitions (e.g., N repetitions). A repetition cycle may include and/or may be used to represent the repetitions (e.g., N repetitions) that may be used for monitoring, receiving, and/or decoding an SS and/or a PDCCH (e.g., a PDCCH candidate or set of candidates). A repetition cycle may begin at time0 and end at timeN−1. A repetition cycle may be repeated, for example, based on a configuration (e.g., configured periodicity) of the associated SS. An example of search spaces with repetitions is shown in FIG. 5.

Figure 5:
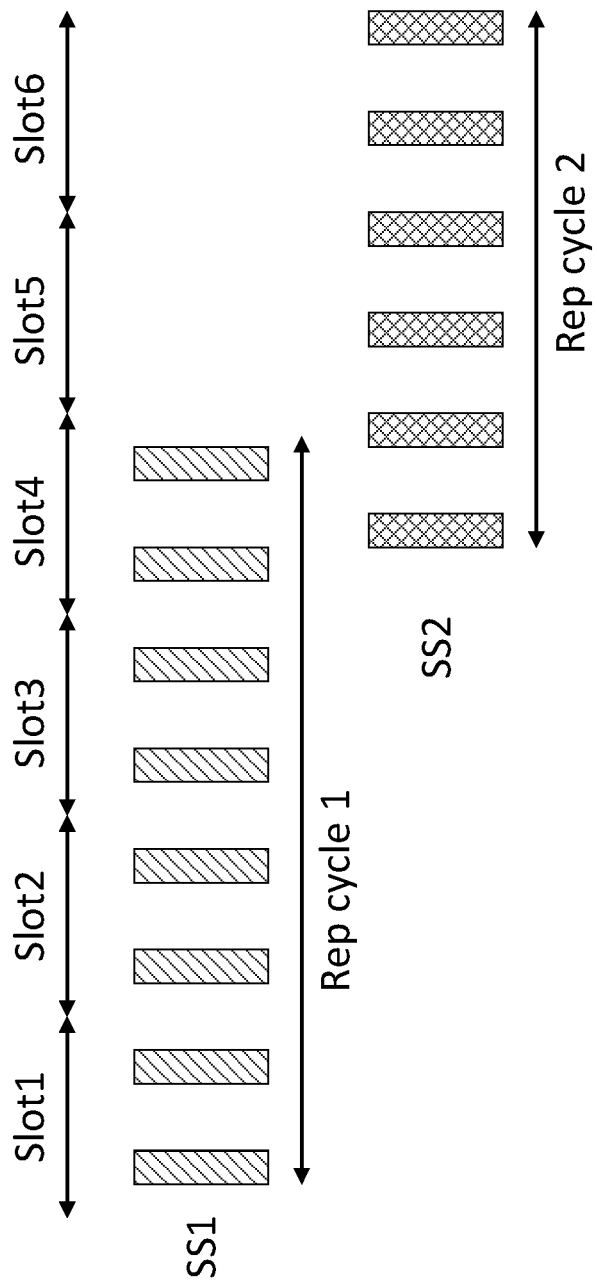
FIG. 5 illustrates an example of search spaces with repetitions.

FIG. 5 illustrates an example of search spaces with repetitions. In an example (e.g., as shown in FIG. 5), a WTRU may monitor and/or may be configured to monitor a first SS (e.g., SS1) and a second SS (e.g., SS2). The first SS (e.g., SS1) may comprise a first number of repetitions configured for and/or associated with it. The second SS (e.g., SS2) may comprise a second number of repetitions configured for and/or associated with it. The first SS (e.g., SS1) may comprise a first repetition (rep) cycle and the second SS (e.g., SS2) may comprise a second repetition (rep) cycle. The first and second number of repetitions may be the same or different. The first and second repetition cycles may be the same or different. For example, the first and second repetition cycles may include a same or different start (e.g., in time and/or time span), a same or different end (e.g., in time or in time span), and/or may comprise a same or different number of repetitions. Time may correspond to at least one of a symbol, a slot, a subframe, and/or a frame, such as a system frame or system frame number (SFN).

An occurrence of a first repetition cycle may overlap (e.g., at least partially overlap) an occurrence of a second repetition cycle. One or more repetitions of the first SS (SS1) in the first repetition cycle may occur in a same time span (e.g., slot) as one or more repetitions of the second SS (SS2) in the second repetition cycle.

A WTRU may determine that one or more repetitions of a first SS (e.g., SS1) in a first repetition cycle occur in a same time span (e.g., slot) as one or more repetitions of a second SS (e.g., SS2) in a second repetition cycle. The WTRU may prioritize one SS over the other (e.g., prioritize monitoring the PDCCH candidates of one SS over the other), for example, based on one or more rules related to the repetitions and/or the repetition cycles of the SSes. The WTRU may prioritize one SS over the other, for example, if the WTRU may exceed a limit (e.g., a blind decoding limit) by monitoring both SSes in the time span. A WTRU may (e.g., if the WTRU prioritizes a first SS over a second SS) monitor more PDCCH candidates in the first SS than the second SS. A WTRU may not monitor PDCCH candidate(s) (e.g., any PDCCH candidates) in the second SS, for example, if a WTRU prioritizes a first SS over a second SS.

In an example (e.g., as shown in FIG. 5), a first SS (e.g., SS1) may be configured, for example, with 8 repetitions and its repetition cycle may span 4 slots. A second SS (e.g., SS2) may be configured, for example, with 6 repetitions and its repetition cycle may span 3 slots. As shown by example in FIG. 5, the repetition cycles of SS1 and SS2 overlap in slot 4. The WTRU may prioritize one SS over the other (e.g., prioritize monitoring the PDCCH candidates of SS1 or SS2 over the other), for example, if the WTRU may exceed a limit (e.g., a blind decoding limit) by monitoring both SS1 and SS2 in slot4. The WTRU may prioritize one SS over another SS, for example, based on one or more rules related to the repetitions and/or the repetition cycles of the SSes.

A WTRU may, for example, prioritize an SS for which has it already monitored a subset of the repetitions over an SS for which the WTRU may be just starting to monitor repetitions. In an example (e.g., as shown in FIG. 5), a WTRU may prioritize SS1 over SS2, for example, since the WTRU has already started monitoring SS1 and is just beginning to monitor SS2.

SSes may include one or more priorities (e.g., configured and/or assigned priorities) that may not be related to CE level or repetitions. For example, a common SS (CSS) may include higher priority than a WTRU/UE-specific SS (USS). A USS with a higher SS index (e.g., configured SS index) may include a higher priority than a USS with a lower SS index, e.g., or vice versa. The priorities may be used, for example, for SSes without CE levels and/or repetitions. One or more of the priorities may be combined with one or more priorities related to CE levels and/or repetitions, for example, to determine SS priority in a time span.

An SS priority determined based on a CE level and/or repetitions may supersede a priority based on SS type (e.g., CSS over USS) and/or SS index. For example, SS1 in FIG. 5 may be a USS and SS2 may be a CSS. Without considering repetitions, SS2 may be higher priority than SS1. Given a rule that an SS for which a repetition cycle already started may include a higher priority than an SS with a repetition cycle just starting, SS1 may include higher priority than SS2 in slot 4. In an example of prioritization, a CSS may include priority over a USS regardless of repetitions.

A WTRU may determine the priority of an SS (e.g., in a time span), for example, based on at least one of the following: the percent of repetitions of the SS (e.g., in a repetition cycle of the SS) the WTRU has monitored (e.g., already monitored), the number of repetitions of the SS (e.g., in a repetition cycle of the SS) the WTRU has monitored (e.g., already monitored), the number of repetitions of the SS the WTRU has remaining to monitor (e.g., in a repetition cycle of the SS), whether the SS has or is configured with repetitions, the number of repetitions in a repetition cycle of the SS, the current repetition number of the SS (e.g., in a repetition cycle of the SS), whether the WTRU has received or decoded (e.g., successfully received or decoded) a PDCCH using one or more repetitions of the SS (e.g., in a repetition cycle of the SS), and/or the like.

A WTRU may determine an SS priority in a time span, for example, according to at least one of the following rules. A WTRU may determine an SS for which the WTRU has monitored (e.g., already monitored) at least X % of the repetitions in a repetition cycle to include higher priority than an SS for which the WTRU has monitored (e.g., already monitored) less than X % of the repetitions in a repetition cycle where X may be configured. A WTRU may determine a first SS for which the WTRU has monitored at least R1 of the repetitions in a repetition cycle of the first SS to include a higher priority than a second SS for which the WTRU has monitored less than R2 of the repetitions in the repetition cycle of the second SS. A WTRU may determine a first SS for which the WTRU has no more than R1 of the repetitions remaining in the repetition cycle of the first SS to include higher priority than a second SS for which the WTRU has more than R2 repetitions remaining in the repetition cycle of the second SS. A WTRU may determine an SS with repetitions to include higher priority than an SS without repetitions. A WTRU may determine an SS without repetitions to include a higher priority than an SS with repetitions. A WTRU may determine an SS with a higher number of repetitions in a repetition cycle to include higher priority than an SS with a lower number of repetitions in a repetition cycle. A WTRU may determine an SS with a lower number of repetitions in a repetition cycle to include higher priority than an SS with a higher number of repetitions in a repetition cycle. A WTRU may determine a first SS for which the current repetition number in a repetition cycle of the first SS is at least R1 to include higher priority than a second SS for which the current repetition number in a repetition cycle of the second SS is less than R2. R1 and R2 may be configured. R1 and R2 may be the same or different. R1 and/or R2 may be 1.

An SS priority rule may apply (e.g., only apply), for example, if a WTRU has not yet received or decoded (e.g., successfully received or decoded) a repeated PDCCH in an SS. For example, a WTRU may receive and/or decode a PDCCH using fewer than the total number of repetitions in a repetition cycle. The WTRU may exclude the corresponding SS from the prioritization rules, for example, until the end of the repetition cycle for the SS. In an example, with reference to the example shown in FIG. 5, a WTRU may exclude SS1 from prioritization, for example, if the WTRU successfully receives the repeated PDCCH in SS1 prior to slot 4. The WTRU may monitor SS2 in slot 4 without considering SS1.

A WTRU may determine a second SS with repetitions is lower in priority than a first SS (with or without repetitions) in a time span. The WTRU may drop or not monitor one or more PDCCH candidates associated with at least one repetition of the second SS in the time span, for example, if fully monitoring both SSes in the time span may exceed a limit.

A WTRU may do one or more of the following, for example, if the WTRU determines an SS with repetitions is lower priority than another SS and monitoring is limited in a time span and/or if the WTRU determines to drop one or more PDCCH candidates associated with a repetition of an SS in a time span. For example, the WTRU may do one or more of the following (e.g., based on the foregoing scenario): the WTRU may drop the entire SS (e.g., the lower priority SS) in the time span and not monitor any PDCCH candidates for the SS in the time span, the WTRU may stop monitoring further repetitions of the SS, and/or the WTRU may stop monitoring further repetitions of the SS, for example, if at least R repetitions or X % of the repetitions of the SS in a repetition cycle have been dropped (e.g., due to SS priorities and/or limits). R and/or X may be configured. Whether to stop or continue monitoring repetitions may be configured.

A WTRU may continue to monitor one or more remaining repetitions of an SS in the repetition cycle, for example, if the WTRU drops or skips monitoring a repetition of the SS in a repetition cycle. A WTRU may extend the repetition cycle to include one or more repetitions of the repetition cycle. The repetition cycle may be extended, for example, by the number of skipped or dropped repetitions.

In examples, priority may be given to ALs for SSes with repetitions, e.g., instead of or in addition to the priorities of the SSes.

In examples, higher ALs (e.g., PDCCH candidates with higher ALs) may include higher priority than lower ALs. In examples, lower ALs (e.g., PDCCH candidates with lower ALs) may include higher priority than higher ALs. A WTRU may (e.g., given a first SS and a second SS in a time span where at least one of the SSes has repetitions) prioritize the ALs of the SSes and monitor the higher priority ALs, for example, that may belong to one or both SSes. In examples, a WTRU may be configured with priorities for ALs for an SS. A WTRU may use the AL priorities (e.g., configured priorities or priorities determined from the ALs themselves) to determine which ALs to monitor for the first and/or second SS, for example, if all ALs of both SSes may not be monitored in a time span without exceeding a limit.

In examples, a WTRU may order the ALs for (e.g., among or across) a first and/or second SS, for example, high priority to low priority. A WTRU may monitor the k highest priority ALs, e.g., such that the limit is not exceeded. In examples, a WTRU may monitor ALs that exceed or are below a threshold (e.g., in value and/or priority) for one or more SSes (e.g., both SSes). A threshold may be configured.

In examples, a WTRU may use priorities, such as an SS type and/or SS index, to determine an SS priority. A WTRU may determine that an SS (e.g., with repetitions) is lower in priority (e.g., than another SS) and/or one or more PDCCH candidates (e.g., associated with the SS) may not be monitored or may be (e.g., may need to be) dropped (e.g., to avoid exceeding a limit). The WTRU may determine the PDCCH candidates (e.g., associated with the SS) to monitor (e.g., drop), for example, based on the AL or AL priority of the candidates. The WTRU may monitor the higher or lower AL or higher AL priority candidates (e.g., the k higher or lower AL candidates or the k higher AL priority candidates). The WTRU may determine the number of candidates k to monitor, for example, such that the limit is not exceeded. The WTRU may monitor (e.g., only monitor) candidates with AL priorities above a threshold that may be configured. The WTRU may monitor (e.g., only monitor) candidates with ALs above or below a threshold that may be configured. In examples, a higher priority may be represented by a lower or higher priority value. For example, a priority above a threshold may correspond to a priority value below a threshold when a lower priority value corresponds to higher priority. A priority above a threshold may correspond to a priority value above a threshold when a higher priority value corresponds to higher priority.

Link recovery (e.g., beam failure recovery (BFR)) may be performed using (e.g., while using) coverage enhancement (e.g., repetitions) and/or a coverage enhancement (CE) level. A CE level and/or a repetition number (e.g., a number of repetitions), which may be associated with a CE level, may be updated (e.g., changed), for example, during or as part of link or beam recovery (e.g., beam failure recovery) or and/or to avoid link failure (e.g., radio link failure) and/or beam failure.

CE and/or CE levels may be associated with repetition numbers. Repetitions of a physical channel or a signal may be used for CE. A repetition may be a repetitive transmission of the same signal and/or data. For example, an N-symbol PDSCH may be repetitively transmitted in M times. A PDSCH may be transmitted over N×M symbols. The repetition of a physical channel and/or a signal may be transmitted or received over one or more subframes, slots, and/or radio frames.

In examples, one or more CE levels may be used, determined, and/or configured for a WTRU. A CE level (e.g., each CE level) may be associated with a set of repetition numbers for a physical channel and/or a signal. Repetition number may be used interchangeably with the number of repetitions. One or more of following may apply: the number of repetitions associated with a CE level may be different based on a physical channel and/or signal, the number of repetitions associated with a CE level for a physical channel and/or a signal may be different based on frequency range, a subset of CE levels may be supported based on a WTRU category, a WTRU type, and/or a WTRU capability, and/or the like.

The number of repetitions associated with a CE level may be different, for example, based on a physical channel and/or signal. For example, a first number of repetitions may be associated with a first CE level for PDSCH and a second number of repetitions may be associated with the first CE level for physical uplink shared channel (PUSCH).

The number of repetitions associated with a CE level for a physical channel and/or a signal may be different, for example, based on frequency range. For example, a first number of repetitions may be associated with a first CE level for a physical channel (e.g., PDSCH or PUSCH) in frequency range 1 (e.g., FR1) and a second number of repetitions may be associated with the first CE level for the physical channel in frequency range 2 (e.g., FR2), for example, where the first number of repetitions and the second number of repetitions may be different.

A first subset of CE levels may be supported, for example, based on WTRU category and/or WTRU type. A second subset of the CE levels (e.g., the rest of the CE levels) may be supported, for example, based on WTRU capability. For example, a first set of CE levels (e.g., CE level #0, #1) may be supported (e.g., without capability signaling) for a first WTRU type (e.g., RedCap WTRU Cat-0) and the first set of CE levels may be supported as optional (e.g., with capability signaling) for a second WTRU type (e.g., RedCap WTRU Cat-1).

A CE level may be determined for a physical channel and/or a signal. A WTRU may determine a CE level (e.g., number of repetitions) for a physical channel and/or a signal based on a downlink measurement. A downlink measurement may be based on a downlink reference signal (e.g., SS/physical broadcast channel (PBCH) block, a channel state indicator reference signal (CSI-RS), a tracking reference signal (TRS), and/or a pathloss measurement RS). One or more of following may apply. A downlink reference signal type to use for a downlink measurement (e.g., to determine a CE level) may be determined, for example, based on the associated physical channel and/or signal. Downlink reference signal types may include, for example, an SS/PBCH block, demodulation reference signal (DM-RS) of PBCH, a CSI-RS, a TRS, a pathloss measurement RS configured for an uplink signal, a DM-RS of PDCCH, a DM-RS of PDSCH, and/or the like. A CE level for PRACH may be determined, for example, based on the measurement of the associated or determined SS/PBCH block or DM-RS of PBCH. A CE level for a PDCCH (e.g., search space and/or CORESET) may be determined, for example, based on a measurement of an SS/PBCH block quasi-collocated (QCL-ed) with the PDCCH. A QCL association between an SS/PBCH block and a PDCCH may be configured in a corresponding CORESET. A CE level for a PDSCH may be determined, for example, based on the measurement of a CSI-RS configured, determined, and/or used for the PDSCH. A CE level for a PUSCH/PUCCH may be determined, for example, based on the measurement of a pathloss reference signal, for example, which may be configured for the PUSCH/PUCCH. A downlink reference signal type to use for a downlink measurement (e.g., to determine a CE level) may be configured, for example, for a physical channel or signal (e.g., each physical channel or signal).

In examples, a WTRU may determine a CE level (e.g., number of repetitions) for a physical channel and/or a signal from the CE level of an associated physical channel and/or a signal. One or more of the following may apply. A CE level of a PDCCH associated with a CORESET (e.g., CORESET-id=0) or a search space (e.g., a common search space) may be determined, for example, based on a CE level determined for a PRACH transmission. For example, a WTRU may determine a CE level for a PRACH transmission. The determined CE level for the PRACH transmission may determine a CE level for a PDCCH associated with a CORESET and/or a search space. A CE level of a PDCCH associated with a WTRU-specific search space may be determined, for example, based on a CE level of a PDCCH associated with a common search space. A CE level of a PDSCH/PUSCH may be determined, for example, based on the CE level of the associated PDCCH (e.g., where a WTRU may receive the scheduling DCI for the PDSCH/PUSCH). A CE level of a PDSCH may be determined, for example, based on a CE level of an associated CSI-RS, for example, which may be QCL-ed with the TCI state indicated for the PDSCH. A CE level of a PUSCH may be determined, for example, based on a CE level of an associated SRS resource, for example, which may be QCL-ed with the SRS resource indicator (SRI) indicated for the PUSCH.

In examples, a CE level for a PDSCH may be determined, for example, based on a scheduling offset of the PDSCH indicated in the associated DCI. A WTRU may determine a CE level for a PDSCH based on the CE level of the associated PDCCH, for example, if the PDSCH scheduling offset is less than a threshold. The WTRU may determine the CE level for the PDSCH based on the indicated CE level in the associated DCI, for example, if the PDSCH scheduling offset is equal to or greater than a threshold. A CE level indication in the associated DCI may be an indication (e.g., explicit indication) of the CE level (e.g., or number of repetitions) or implication indication (e.g., CE level configured and/or determined for an indicated TCI state).

A CE level may be determined for a beam. In examples, a WTRU may determine a CE level (e.g., number of repetitions) for a physical channel and/or a signal, for example, based on the determined TCI state and/or SRI. For example, a WTRU may be configured with one or more TCI states. A TCI state (e.g., each TCI state) may be associated with a reference signal (e.g., a reference signal configured as a QCL type). A WTRU may determine a CE level for a TCI state, for example, based on a measurement of the associated reference signal (RS) for the TCI state.

In examples, a WTRU may be configured with a CE level for at least one TCI state (e.g., each TCI state) and the WTRU may determine a CE level for a physical channel and/or a signal, for example, based on the determined TCI state for the physical channel and/or the signal. One or more of following may apply. One or more TCI states may be configured for a CORESET, where a TCI state (e.g., each TCI state) may be associated with a CE level. A WTRU may monitor a PDCCH SS. The WTRU may determine a CE level for monitoring the PDCCH search space, for example, based on the configured one or more TCI states. A TCI state may be determined, for example, if there are multiple TCI states configured for a CORESET. A determined TCI state (e.g., determined at the time for monitoring the PDCCH search space) may be used to determine the CE level. A WTRU may determine a TCI state for a PDSCH reception. A CE level of the PDSCH may be determined, for example, as a function of the determined TCI state. A TCI state for a PDSCH may be determined, for example, based on an indication in the associated DCI and/or the TCI state of the associated CORESET (e.g., TCI state of the lowest CORESET identity). A WTRU may determine an SRI for a PUSCH transmission. The CE level of the PUSCH may be determined, for example, as a function of the determined SRI. An SRI for a PUSCH may be determined, for example, based on an indication in the associated DCI.

Beam failure recovery (BFR) may be implemented and/or performed with CE levels. In examples, one or more CE levels may be used for a physical channel and/or a signal. A BFR procedure may be dependent on the CE level used and/or determined for the physical channel and/or signal. A BFR procedure with one or more CE levels may be based on, for example, one or more of following: beam failure detection (BFD), new candidate beam determination, an indication of a determined new candidate beam, a radio link failure (RLF) declaration, and/or the like.

A BFR procedure with one or more CE levels may be based on BFD. A WTRU may measure a beam quality of one or more beam reference signals configured for BFD (e.g., a set of beam reference signals configured for BFD may be referred to as $q_0$). A beam reference signal for configured CORESETs may be used, for example, if $q_0$ is not configured. A BFD reference signal in $q_0$ may be referred to as BFD-RS. CSI-RS and/or synchronization signal block (SSB) may be used as a BFD-RS. $q_0$ may be configured for each CE level, for example, if one or more CE levels are used. For example, BFD reference signals for CE level 1 may be referred to as $q_{0,CE1}$, BFD reference signal for CE level 2 may be referred to as $q_{0,CE2}$, and so on. A first number of repetitions may be used for BFD-RS for a first CE level (e.g., CE level 1) and a second number of repetitions may be used for BFD-RS for a second CE level (e.g., CE level 2).

A BFR procedure with one or more CE levels may be based on a new candidate beam determination. A WTRU may be configured with a list of new candidate beams (e.g., $q_1$). A WTRU may determine one or more new candidate beams based on one or more conditions. One or more of the following may apply. A condition may be based on the measurement quality of a new candidate beam (e.g., whether the measurement of a new candidate beam is above a threshold). A measurement may be, for example, at least one of an L1-reference signal received power (RSRP), an L1-signal to interference plus noise ratio (SINR), and/or a hypothetical block error ratio (BLER) of PDCCH. A threshold may be determined, for example, based on the CE level (e.g., number of repetitions). An offset may be used for a measurement based on the CE level (e.g., number of repetitions). A measurement result may be compensated, for example, based on the number of repetitions used for the CE level. A list of new candidate beams may be configured for a CE level (e.g., each CE level referred to as $q_{1,CE1}$, $q_{1,CE2}$) A WTRU may search (e.g., first search) a new candidate beam in the list of new candidate beams associated with the CE level determined. A WTRU may search a new candidate beam in the list of new candidate beams associated with a higher CE level (e.g., a CE level with a larger number of repetitions), for example, if a WTRU fails to find any new candidate beam which meets the one or more conditions. A WTRU may search a new candidate beam in $q_{1,CE2}$, for example, if a measurement of new candidate beams (e.g., all new candidate beams) in $q_{1,CE1}$ is below a threshold.

A BFR procedure with one or more CE levels may be based on an indication of a determined new candidate beam. A WTRU may indicate a determined new candidate beam (e.g., $q_{new}$) to a base station (e.g., a gNB). For example, a WTRU may use a PRACH resource to indicate a determined new candidate beam. A set of PRACH resources may be configured for a new candidate beam indication. The set of PRACH resource may be associated with a new candidate beam list of a CE level (e.g., $q_{1,CE1}$). One or more sets of PRACH resources may be configured and/or used. A set of PRACH resources (e.g., each set of PRACH resources) may be associated with a CE level. A PRACH resource (e.g., each PRACH resource within a set of PRACH resources for a CE level) may be associated with a new candidate beam in the new candidate beam list associated with the CE level. A number of repetitions for a set of PRACH resources may be determined, for example, based on the associated CE level. A WTRU may determine a set of PRACH resources, for example, based on a CE level determined for a new candidate beam determined. A PRACH resource within the set of PRACH resources may be determined, for example, based on the associated new candidate beam determined.

A BFR procedure with one or more CE levels may be based on an RLF declaration. A WTRU may declare an RLF, for example, if the WTRU fails to find a new candidate beam in the candidate beam list associated with a highest CE level (e.g., a CE level associated with the largest number of repetitions).

Random access response (RAR) repetition may be implemented. Examples described for PDCCH repetition may be applicable to an RAR (e.g., msg2, or msgB). An RAR may include a PDCCH and/or a PDSCH. An RAR PDCCH may carry an RAR. An RAR PDCCH may provide scheduling information and/or other parameters for an RAR PDSCH. In the examples and embodiments described herein, RAR repetition may correspond to repetition of an RAR PDCCH and/or an RAR PDSCH.

Whether a configuration for PDCCH repetition is applicable to RAR (e.g., RAR PDCCH) may depend on a pathloss measurement and/or a CE level (e.g., as described herein). A configuration may be associated with and/or part of a random access (RACH or PRACH) configuration associated with a CE level. A configuration applicable to RAR for a CE level (e.g., each CE level) may include, for example, at least the same parameters (e.g., repetition and/or offset) described for PDCCH repetition (e.g., a general case of PDCCH repetition). A configuration may include, for example, at least one of the following: at least one parameter for the determination of an RNTI value (e.g., random access RNTI (RA-RNTI) or MsgB RNTI (MSGB-RNTI) that may be specific to a repetition and/or offset (e.g., each repetition and/or offset), a random access response window or msgB-response window (e.g., specific to the CE level), and/or the like.

A configuration applicable to RAR may include at least one parameter for the determination of an RNTI value (e.g., RA-RNTI or MSGB-RNTI) that may be specific to a repetition and/or offset (e.g., each repetition and/or offset). RA-RNTI or MSGB-RNTI may be derived, for example, based on a formula that may use one or more parameters (e.g., an index of a first OFDM symbol, an index of first slot of the PRACH occasion, an index in frequency domain, etc.) and the at least one parameter. The at least one parameter may include, for example, at least one of the repetition parameter, the offset parameter, and/or additional parameters.

A WTRU may report an indication of a best repetition. A WTRU may be configured to perform a measurement associated with a PDCCH repetition (e.g., each PDCCH repetition), for example, if a PDCCH subject to PDCCH repetition is successfully decoded. The measurement may be performed, for example, on at least one of: a DM-RS of a PDCCH repetition, a DM-RS of PDSCH (e.g., if in the same resource, such as a time symbol, slot, resource block) as the PDCCH repetition, a CSI-RS associated with a PDCCH repetition, and/or the like. A measurement may be a signal strength measurement (e.g., similar to L1-RSRP) and/or a signal quality measurement (e.g., similar to L1-SINR, L1-RSRQ or CQI). A WTRU may report, for example, at least one of the following: an indication (e.g., index) of the PDCCH repetition with the best result (e.g., maximum result), measurement results for the best PDCCH repetition or for each PDCCH repetition, a CSI-RS indicator (CRI) corresponding to the best PDCCH repetition, and/or the like.

A WTRU may trigger reporting, for example, upon successful reception of the PDCCH. A report may be included, for example, in an L1 report (e.g., CSI), in a MAC CE, and/or in an RRC message (e.g., a measurement report). The report may be multiplexed in PUSCH (e.g., using UCI multiplexing) or in a transport block (e.g., for a MAC CE or an RRC message). The PUSCH and/or TB carrying the report may be scheduled via a PDCCH transmission.

A WTRU may determine whether to perform a measurement, for example, based on a field and/or property of DCI in the PDCCH, and/or based on higher layer configuration associated with a search space or a PDCCH configuration.

For example, a measurement may be configured for PDCCH carrying an RAR or for PDCCH scheduling PDSCH carrying an RAR. A WTRU may send a measurement report subsequent to receiving the RAR, for example, on a PUSCH with resources that may have been granted by the RAR.

A random access procedure may include one or more messages. In an example, a first message (e.g., msg1 or msgA) may be or may include a preamble. A WTRU may transmit the first message. A second message (e.g., msg2 or msgB) may be or may include an RAR. A WTRU may receive the second message. A third message (e.g., msg3) may be a message transmitted by the WTRU. An RAR may provide a grant for a PUSCH that may be used for msg3. The WTRU may send the measurement report in msg3.

The measurement report may include information, for example a set of bits, indicating the best repetition, for example, to minimize overhead. The WTRU may determine whether to perform reporting, for example, based on a RACH configuration and/or a field in a random access response. An indication of a best repetition may allow (e.g., enable) a network (e.g., a gNB) to transmit each PDCCH repetition using a different beam and to determine (e.g., immediately determine) the best beam, for example, from the received msg3.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU), the WTRU comprising:
a processor configured to:
receive an indication of a first search space (SS) configuration and an indication of a second SS configuration, wherein one or more first physical downlink control channel (PDCCH) candidates are indicated for a first SS associated with the first SS configuration, wherein one or more second PDCCH candidates are indicated for a second SS associated with the second SS configuration, wherein of the first SS comprises one or more repetitions configured within a first repetition cycle, and wherein the second SS comprises one or more repetitions configured within a second repetition cycle;
determine, based at least in part on information indicative of the one or more repetitions, a priority of the first SS relative to the second SS, wherein the priority is determined for a time span, wherein the time span comprises a first number of PDCCH candidates in the first SS and a second number of PDCCH candidates in the second SS, and wherein the priority is further determined by prioritizing an SS for which monitoring of its repetition cycle has already started over an SS for which monitoring of its repetition cycle has not yet started;
based on a condition that a total of the first number of PDCCH candidates and the second number of PDCCH candidates exceeds a decoding limit during the time span, determine one of the first SS and the second SS to monitor based on the determined priority; and
monitor the determined one SS.

2. The WTRU of claim 1, wherein the priority is further determined by prioritizing an SS having a lower number of repetitions over an SS having a higher number of repetitions.

3. The WTRU of claim 1, wherein the first SS is determined to be associated with a higher priority than the second SS on a condition that the PDCCH candidates of the first SS correspond to a repetition number in the first repetition cycle of the first SS greater than a first threshold and the PDCCH candidates of the second SS correspond to a repetition number in the second repetition cycle of the second SS less than a second threshold.

4. The WTRU of claim 1, wherein each SS is configured with a monitoring periodicity.

5. The WTRU of claim 1, wherein the decoding limit is a maximum number of blind decodes, and wherein the processor is configured to monitor the determined one SS by being configured to perform blind decoding on the determined one SS.

6. A method, comprising:
receiving an indication of a first search space (SS) configuration and an indication of a second SS configuration, wherein one or more first physical downlink control channel (PDCCH) candidates are indicated for a first SS associated with the first SS configuration, wherein one or more second PDCCH candidates are indicated for a second SS associated with the second SS configuration, wherein of the first SS comprises one or more repetitions configured within a first repetition cycle, and wherein the second SS comprises one or more repetitions configured within a second repetition cycle;
determining, based at least in part on information indicative of the one or more repetitions, a priority of the first SS relative to the second SS, wherein the priority is determined for a time span, wherein the time span comprises a first number of PDCCH candidates in the first SS and a second number of PDCCH candidates in the second SS, and wherein the priority is further determined by prioritizing an SS for which monitoring of its repetition cycle has already started over an SS for which monitoring of its repetition cycle has not yet started;
based on a condition that a total of the first number of PDCCH candidates and the second number of PDCCH candidates exceeds a decoding limit during the time span, determining one of the first SS and the second SS to monitor based on the determined priority; and
monitoring the determined one SS.

7. The method of claim 6, wherein the priority is further determined by prioritizing an SS having a lower number of repetitions over an SS having a higher number of repetitions.

8. The method of claim 6, wherein the first SS is determined to be associated with a higher priority than the second SS on a condition that the PDCCH candidates of the first SS correspond to a repetition number in the first repetition cycle of the first SS greater than a first threshold and the PDCCH candidates of the second SS correspond to a repetition number in the second repetition cycle of the second SS less than a second threshold.

9. The method of claim 6, wherein each SS is configured with a monitoring periodicity.

10. The method of claim 6, wherein the decoding limit is a maximum number of blind decodes, and wherein monitoring the determined one SS comprises performing blind decoding on the determined one SS.

11. A non-transitory computer readable medium storing instructions which, when executed by one or more processors, cause the one or more processors to carrying out a method comprising:
- receiving an indication of a first search space (SS) configuration and an indication of a second SS configuration, wherein one or more first physical downlink control channel (PDCCH) candidates are indicated for a first SS associated with the first SS configuration, wherein one or more second PDCCH candidates are indicated for a second SS associated with the second SS configuration, wherein the first SS comprises one or more repetitions configured within a first repetition cycle, and wherein the second SS comprises one or more repetitions configured within a second repetition cycle;
- determining, based at least in part on information indicative of the one or more repetitions, a priority of the first SS relative to the second SS, wherein the priority is determined for a time span, wherein the time span comprises a first number of PDCCH candidates in the first SS and a second number of PDCCH candidates in the second SS, and wherein the priority is further determined by prioritizing an SS for which monitoring of its repetition cycle has already started over an SS for which monitoring of its repetition cycle has not yet started;
- based on a condition that a total of the first number of PDCCH candidates and the second number of PDCCH candidates exceeds a decoding limit during the time span, determining one of the first SS and the second SS to monitor based on the determined priority; and
- monitoring the determined one SS.

12. The non-transitory computer readable medium of claim 11, wherein the priority is further determined by prioritizing an SS having a lower number of repetitions over an SS having a higher number of repetitions.

13. The non-transitory computer readable medium of claim 11, wherein the first SS is determined to be associated with a higher priority than the second SS on a condition that the PDCCH candidates of the first SS correspond to a repetition number in the first repetition cycle of the first SS greater than a first threshold and the PDCCH candidates of the second SS correspond to a repetition number in the second repetition cycle of the second SS less than a second threshold.

14. The non-transitory computer readable medium of claim 11, wherein each SS is configured with a monitoring periodicity.

15. The non-transitory computer readable medium of claim 11, wherein the decoding limit is a maximum number of blind decodes, and wherein monitoring the determined one SS comprises performing blind decoding on the determined one SS.

* * * * *